(12) United States Patent
Duan et al.

(10) Patent No.: US 12,641,359 B2
(45) Date of Patent: May 26, 2026

(54) CHARGING BOX

(71) Applicant: LUXSHARE ELECTRONIC TECHNOLOGY (KUNSHAN) LTD., Kunshan City (CN)

(72) Inventors: Yongbin Duan, Kunshan City (CN); Long Yang, Kunshan City (CN); Dahai Xu, Kunshan City (CN); Huashan Meng, Kunshan City (CN)

(73) Assignee: LUXSHARE ELECTRONIC TECHNOLOGY (KUNSHAN) LTD., Kunshan City (CN)

( * ) Notice: Subject to any disclaimer, the term of this patent is extended or adjusted under 35 U.S.C. 154(b) by 759 days.

(21) Appl. No.: 18/089,076

(22) Filed: Dec. 27, 2022

(65) Prior Publication Data

US 2023/0217149 A1 Jul. 6, 2023

(30) Foreign Application Priority Data

Dec. 30, 2021 (CN) .......................... 202111666431.8

(51) Int. Cl.
| | |
|---|---|
| *H02J 7/00* | (2026.01) |
| *A45C 11/00* | (2006.01) |
| *H02J 7/70* | (2026.01) |
| *H02J 50/00* | (2016.01) |
| *H02J 50/10* | (2016.01) |

(Continued)

(52) U.S. Cl.
CPC .......... *H04R 1/1025* (2013.01); *A45C 11/001* (2025.01); *H02J 7/70* (2026.01); *H02J 7/731* (2026.01); *H02J 50/005* (2020.01); *H02J 50/10* (2016.02); *H02K 35/02* (2013.01); *H02N 2/18* (2013.01); *H04R 2460/17* (2013.01)

(58) Field of Classification Search
CPC ........ H02J 50/005; H02J 50/10; H02J 7/0042; H02J 7/0044; A45C 11/001; H04R 2460/17; H04R 1/1025; H02K 35/02; H02N 2/18
USPC .......................................... 320/108; 307/104
See application file for complete search history.

(56) References Cited

U.S. PATENT DOCUMENTS

| | | | | |
|---|---|---|---|---|
| 2003/0137274 | A1* | 7/2003 | Sastry ....................... | H02J 7/32 320/101 |
| 2009/0051314 | A1* | 2/2009 | Raghuprasad ......... | H02K 53/00 320/108 |

FOREIGN PATENT DOCUMENTS

| | | | |
|---|---|---|---|
| CN | 209046838 U | | 6/2019 |
| CN | 210670505 U | * | 6/2020 |

(Continued)

*Primary Examiner* — Zixuan Zhou
(74) *Attorney, Agent, or Firm* — Birch, Stewart, Kolasch & Birch, LLP

(57) ABSTRACT

The present disclosure relates to a charging box, comprising a box body, a box cover, a battery, a charging assembly and a circuit assembly. The box body is internally provided with a product cabin for accommodating a product; the box cover is arranged at an opening of the box body; the battery is arranged in the box body; the charging assembly comprises a magnet pendulum bob and a coil structure arranged around it, wherein a first end of the magnet pendulum bob is rotatably connected with the box body and a second end is a free end; and the circuit assembly is electrically connected with the coil structure and the battery. Therefore, by arranging the charging box in a special shape, the coil structure may cut a magnetic field of the magnet pendulum bob to generate induced current to charge the charging box so as to increase endurance.

14 Claims, 2 Drawing Sheets

(51) Int. Cl.
  *H02K 35/02*       (2006.01)
  *H02N 2/18*        (2006.01)
  *H04R 1/1025*      (2026.01)

(56)              References Cited

FOREIGN PATENT DOCUMENTS

| CN | 112887863 A | 6/2021 |
| CN | 113179000 A | 7/2021 |
| CN | 214315579 U | 9/2021 |
| CN | 215991163 U | 3/2022 |
| CN | 216873376 U | 7/2022 |
| CN | 216905251 U | 7/2022 |
| KR | 10-2019-0020550 A | 3/2019 |

* cited by examiner

CHARGING BOX

CLAIM OF PRIORITY AND CROSS-REFERENCE TO RELATED APPLICATION(S)

This application claims the benefit of Chinese Patent Application No. 202111666431.8, filed on Dec. 30, 2021, which is incorporated herein by reference in its entirety.

BACKGROUND OF THE DISCLOSURE

1. Field of the Disclosure

The embodiment of the present disclosure relates to the field of charging accessories, particularly to a charging box.

2. Description of the Related Art

With development of electronic techniques, portable products or miniaturized electronic devices such as wireless stereo (TWS) earphones have been widely applied. The TWS earphones are advanced wireless earphones and are capable of being connected to intelligent electronic devices such as mobile phones by way of Bluetooth wirelessly and the like, such that left and right tracks of Bluetooth are wirelessly and separately used in deed. At present, with continuous development of the TWS wireless Bluetooth earphone market, a charging box for storage and charging the earphone has become an indispensable important accessory. In the prior art, the charging box is usually designed in a square shape which is inflexible and short in time of endurance, and may not provide enough electric energy when a product needs to be charged.

BRIEF DESCRIPTION OF THE DISCLOSURE

In view of this, the embodiment of the present disclosure provides a charging box which may increase endurance based on the electromagnetic induction principle by designing the shape of a box body and an internal charging assembly.

The charging box provided by the embodiment of the present disclosure includes:

a box body, internally provided with a product cabin, the product cabin being configured to accommodate a product;

a box cover, openably and closably arranged at an opening of the box body;

a battery, arranged in the box body;

a charging assembly, including a magnet pendulum bob and a coil structure arranged in a periphery of the magnet pendulum bob, wherein a first end of the magnet pendulum bob is rotatably connected with the box body and a second end of the magnet pendulum bob is a free end; and a circuit assembly, electrically connected with the coil structure to receive an induced current generated by the coil structure, the circuit assembly being electrically connected with the battery.

Optionally, a radial dimension of the first end of the magnet pendulum bob is smaller than that of the second end.

Optionally, the charging assembly further comprises a generator, where the generator is configured to convert kinetic energy generated by a motion of the magnet pendulum bob into electric energy, and the generator is electrically connected with the circuit assembly.

Optionally, the charging box further includes a transmission part, the transmission part being configured to transmit the motion of the magnet pendulum bob to the generator.

Optionally, the charging box further comprises a partition plate arranged in the box body to divide the box body into a first cavity and a second cavity.

Optionally, the charging assembly, the generator and the transmission part are arranged in the first cavity; and the battery, the product cabin and the circuit assembly are arranged in the second cavity.

Optionally, the first end of the magnet pendulum bob is rotatably connected with the partition plate.

Optionally, the coil structure includes a coil bracket, the generator being fixedly arranged on an outer side of the coil bracket.

Optionally, the transmission part includes a first gear set, a transmission bar and a second gear set, the magnet pendulum bob being connected with the first gear set, the generator being connected with the second gear set, and the first gear set and the second gear set being connected through the transmission bar.

Optionally, the product is an earphone, the product cabin being configured to be a copying slot for fixing the earphone, where a bottom of the box body is formed as a curved surface, and the charging box further comprises a balancing weight arranged in the box body.

A charging box provided by the embodiment of the present disclosure discloses includes a box body, a box cover, a battery, a charging assembly and a circuit assembly. The box body is internally provided with a product cabin for accommodating a product; the box cover is openably and closably arranged at an opening of the box body; the battery is arranged in the box body; the charging assembly comprises a magnet pendulum bob and a coil structure arranged in a periphery of the magnet pendulum bob, where a first end of the magnet pendulum bob is rotatably connected with the box body and a second end of the magnet pendulum bob is a free end; and the circuit assembly is electrically connected with the coil structure and the battery, where a bottom of the box body is formed as a curved surface. The charging box further includes a balancing weight arranged at the bottom of the box body. Therefore, according to a technical solution of the embodiment of the present disclosure, by arranging the charging box in a special shape, the charging box is in form of a tumbler, so that in swinging process of the charging box, the coil structure may cut a magnetic field of the magnet pendulum bob to generate induced current to charge the charging box so as to increase endurance.

BRIEF DESCRIPTION OF THE DRAWINGS

The embodiment of the present disclosure is described with reference to the drawings, the above-mentioned and other purposes, features and advantages of the embodiment of the present disclosure will become clearer. In the drawings.

DESCRIPTION OF NUMERALS IN DRAWINGS

1—box body; 101—first cavity; 102—second cavity; 11—product cabin; 12—partition plate; 2—box cover;

3—battery; 4—charging assembly; 41—magnet pendulum bob; 411—first end of magnet pendulum bob; 412—second end of magnet pendulum bob; 42—coil structure; 421—coil bracket; 43—generator; 431—motor shaft; 5—transmission part; 51—first gear set; 511—fan-shaped gear; 52—transmission bar; 53—second gear set; 6—balancing weight; 7—circuit assembly.

DETAILED DESCRIPTION OF EMBODIMENTS OF THE DISCLOSURE

Description on the present disclosure is made below based on the embodiments, and the present disclosure is not only limited to these embodiments. In the detailed description of the present disclosure below, some specific detailed parts are described in detail. Those skilled in the art may also understand the present disclosure totally without description of the detailed parts. In order to avoid confusion of essence of the present disclosure, known methods, processes, flows, components and circuits are not narrated in detail.

In addition, those of ordinary skill in the art may understand that the drawings provided herein are merely for explanatory purposes rather than being drawn in proportion.

Unless otherwise specified here, similar words such as "include" and "comprise" in the whole application document may be construed as inclusive meaning rather than exclusive or exhaustive meaning. That is to say, it is the meaning of "include, but not limited to".

In description of the present disclosure, it should be understood that terms "first" and "second" are only used for a description purpose rather than being construed to indicate or imply relative importance. In addition, in the description of the present disclosure, unless otherwise specified, "a plurality of" means two or more than two.

Unless otherwise specified and defined, terms such as "install", "connected", "connect" and "fix" may be understood in a broad sense. For example, it may be either a fixed connection or a detachable connection or integral connection; it may be either a mechanical connection or an electrical connection; it may be either a direct connection or an indirect connection through an intermediate, and may be a communication in two components or an interaction relation between the two components, unless otherwise specified. Those skilled in the art may understand specific meaning of the terms in the present disclosure under specific circumstances.

The technical scheme of the present disclosure is further described through specific embodiments in combination with the drawings.

Figure 1:
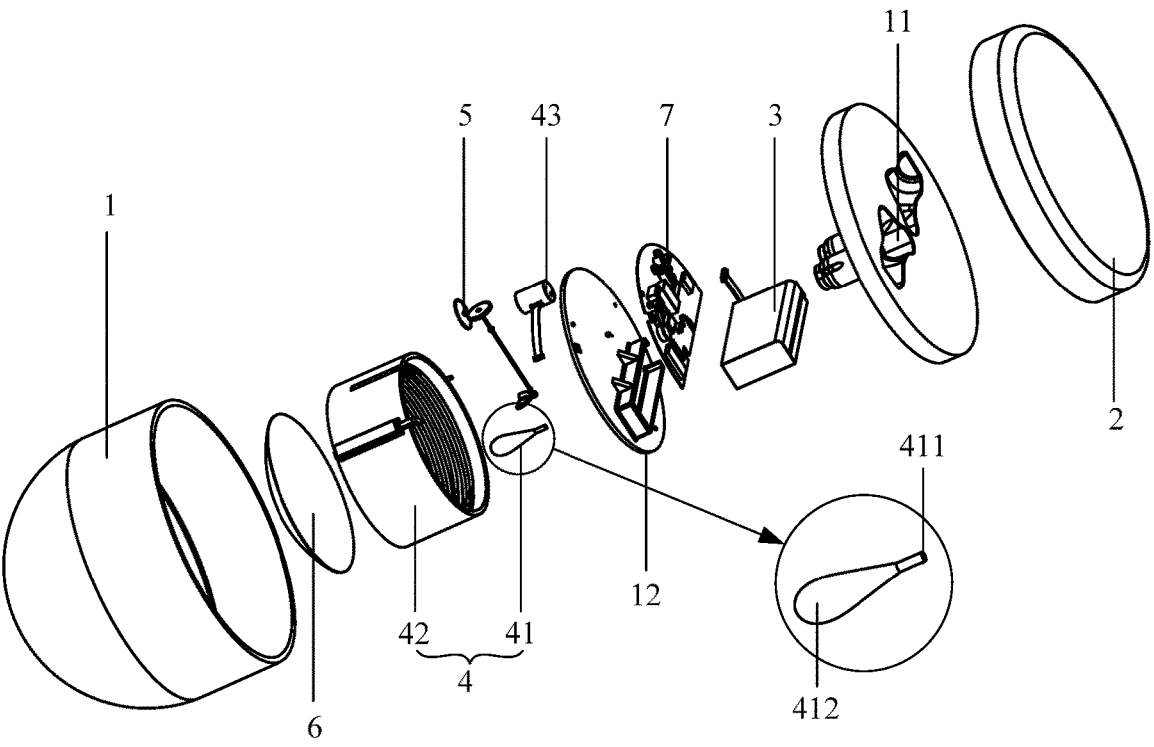
FIG. 1 is an exploded view of a charging box of an embodiment of the present disclosure.
Figure 2:
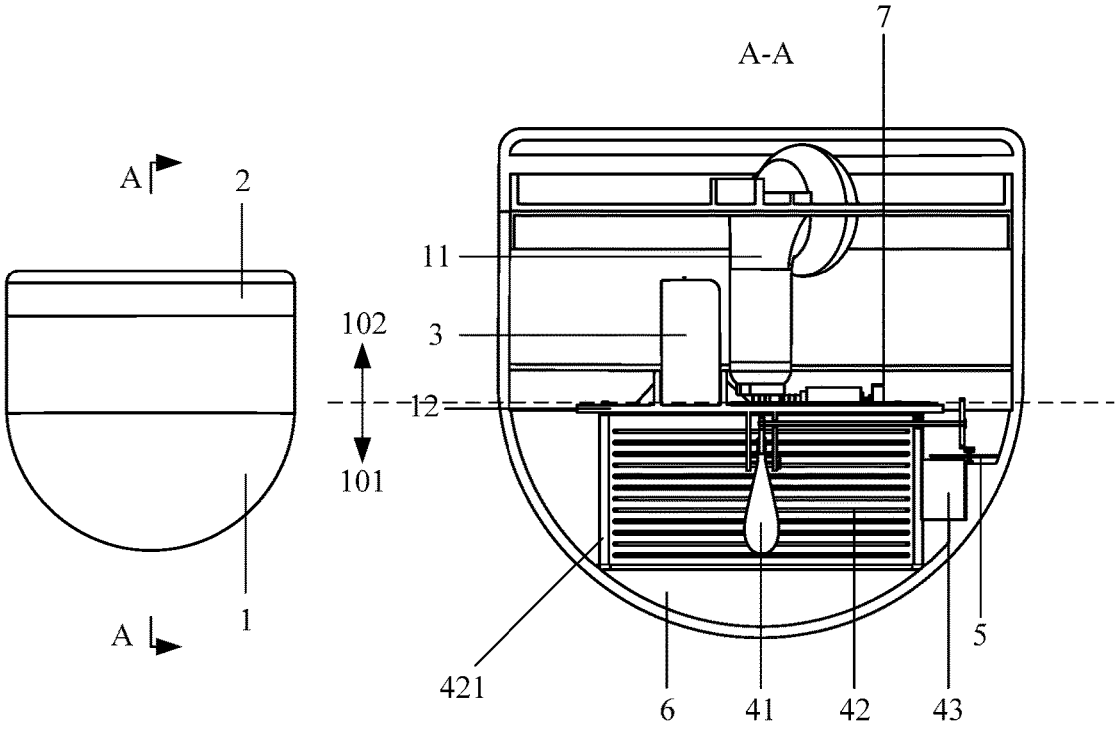
FIG. 2 is a section view of a charging box of an embodiment of the present disclosure along a plane A-A.

FIG. 1 is an exploded view of a charging box of an embodiment of the present disclosure. FIG. 2 is a section view of a charging box of an embodiment of the present disclosure along a plane A-A. As shown in FIG. 1 and FIG. 2, the charging box includes a box body 1, a box cover 2, a battery 3, a charging assembly 4 and a circuit assembly 7. The box body 1 is internally provided with a product cabin 11 for accommodating a product, the box cover 2 is openably and closably arranged at an opening of the box body 1, and the battery 3 is arranged in the box body 1.

The charging assembly 4 includes a magnet pendulum bob 41 and a coil structure 42 arranged in a periphery of the magnet pendulum bob 41, where a first end 411 of the magnet pendulum bob 41 is rotatably connected with the box body 1 and a second end 412 of the magnet pendulum bob is a free end. As an electromagnetism induction phenomenon is a phenomenon that a conductor in a closed circuit performs a magnetic induction line cutting motion to generate an induced current in the conductor, i.e., in a using process, as the magnet pendulum bob 41 has a magnetic field around, under a condition that the conductor coil structure 42 is arranged around the magnet pendulum bob, a relative motion generated between the magnet pendulum bob 41 and the coil structure 42 will enable the coil structure 42 to cut the magnetic field of the magnet pendulum bob 41, so as to generate the induced current in the coil structure 42. In the embodiment, the coil structure 42 includes a coil bracket 421 that supports its structure, and the coil bracket 421 is made from an insulating material, so as to shield influence of an external magnetic field to the charging assembly 4.

A bottom of the box body 1 is formed as a curved surface, and is provided with a balancing weight 6. In the embodiment, the bottom of the box body 1 is formed hemispherical, and the balancing weight 6 is arranged at a vertex of a hemisphere. That is, the charging box is placed on a plane such as a desktop, the balancing weight 6 is capable of stabilizing the center of gravity of the charging box to the bottom of the box body 1, so that the charging box has strong stability. When the charging box is subjected to a certain external thrust to incline towards one side, the center of gravity thereof deviates therewith. At the moment, with respect of nature of the force, resistance will be generated between the charging box and the desktop to resist interference of the resistance, such that the charging box inclines towards the other side under the action of the resistance to perform a swinging motion for a period of time, so as to restore balance of the box body 1. For simplicity of description, the charging box may be regarded as a structure similar to a tumbler. In a using process, a user may apply a force to the charging box, so that the charging box produces a swinging motion, and therefore, the magnet pendulum bob 41 inside rotates as a result of inertia, so that the coil structure 42 may cut the magnetic field of the magnet pendulum bob 41 to generate an induced current.

Such a design may enable the charging box to be charged as the user pushes the box body 1, so that endurance of the charging box is increased. Moreover, the design similar to the tumbler may further enhance interestingness of the shape of the charging box, so that it is better in availability. Optionally, the bottom of the box body 1 may further be formed as other curved surfaces to realize similar stressed structures.

Further, a radial dimension of the first end 411 of the magnet pendulum bob 41 is smaller than that of the second end 412. In the embodiment, the dimension of the magnet pendulum bob 41 is gradually increased in a direction from the first end 411 to the second end 412, and a contour thereof is formed as a smooth curve approximating a drop shape. As the magnetic field intensity of the magnet is in direct proportion to the dimension of the magnet, and at the same time, the induced current generated by the conductor that cuts the magnetic field is also in direct proportion to the magnetic field intensity, the dimension of the second end 412 may be larger than that of the first end 411, so that the magnet pendulum bob 41 may provide a stronger magnetic field. Furthermore, as the inertia of an object is in direct proportion to the mass of the object, the center of gravity of the magnet pendulum bob 41 may be located at the second end 412, so that the magnet pendulum bob 41 may have a larger rotating amplitude. Optionally, the magnet pendulum bob 41 may further have other shapes. Besides, the magnet pendulum bob 41 may further have a mode of motion except rotation. For example, multi-angle rotating motion through a spherical hinge may also realize a similar effect.

However, as the induced current generated by the coil structure 42 that cuts the magnetic field of the magnet pendulum bob 41 is an alternating current and may not charge the battery 3 directly, the charging box is provided with the circuit assembly 7 electrically connected with the coil structure 42, so as to receive the induced current generated by the magnet pendulum bob 41. The circuit assembly 7 converts the received induced current into suitable currents capable of being electrically connected therewith to charge the battery 3 by other processing such as AC-DC or boosting.

Figure 3:
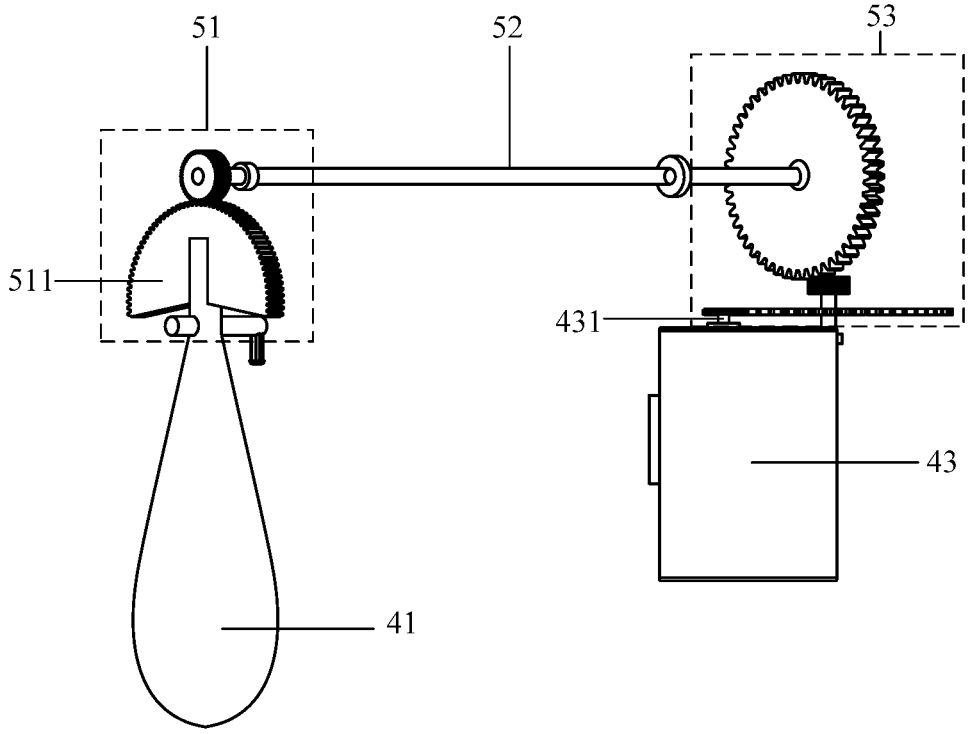
FIG. 3 is a schematic structure diagram of a transmission part of a charging box of an embodiment of the present disclosure.

FIG. 3 is a schematic structure diagram of a transmission part of a charging box of an embodiment of the present disclosure. As shown in FIG. 3, the charging assembly 4 further includes a generator 43, configured to convert kinetic energy generated by motion of the magnet pendulum bob 41 into electric energy. That is, when the magnet pendulum bob 41 rotates as the charging box swings under the action of an external force, a torque generated by rotation of the magnet pendulum bob 41 is conducted to a motor shaft 431 of the generator 43, so that the motor shaft 431 rotates so as to further convert kinetic energy of the magnet pendulum bob 41 into electric energy. Furthermore, the generator 43 is arranged outside the coil bracket 421, so as to prevent a magnetic force generated when the generator 43 generates electricity from affecting the magnet pendulum bob 41 and the coil structure 42.

Therefore, the charging box further includes a transmission part 5, configured to transmit a motion of the magnet pendulum bob 41 to the generator 43. In the embodiment, the transmission part 5 includes a first gear set 51, a transmission bar 52 and a second gear set 53, the first gear set 51 being connected with the first end 411 of the magnet pendulum bob 41, the second gear set 53 being connected with the motor shaft 431, and the first gear set 51 and the second gear set 53 being transmitted by the transmission bar 52. The first gear set 51 includes a fan-shaped gear 511, the first end 411 of the magnet pendulum bob 41 being fixed to a center of the fan-shaped gear 511. That is, the fan-shaped gear 511 plays a role of amplifying a rotating torque of the first end 411 of the magnet pendulum bob 41. When the magnet pendulum bob 41 rotates, the fan-shaped gear 511 will rotate along with the first end 411 so as to drive the first gear set 51, and transfer the torque to the second gear set 53 through the transmission bar 52, so that the motor shaft 431 rotates eventually. Optionally, the transmission part 5 may further have other setting modes.

It is to be noted that as rotation of the magnet pendulum bob 41 in the embodiment is a motion of swing between +90 degrees and −90 degrees, the motor shaft 431 also reciprocates rotatably clockwise and anticlockwise therewith. However, the rotating direction of the motor shaft 431 does not affect power generation efficiency of the generator 43 because the generator 43 rotates in the magnetic field with a stator to convert kinetic energy into electric energy by way of cutting the magnetic induction line to generate the current. However, the current generated by the generator 43 is also an alternating current which may not charge the battery 3 directly. Therefore, the generator 43 is further electrically connected with the circuit assembly 7, so that the circuit assembly 7 may receive the current generated by the generator 43 and perform other processing such as AC-DC or boosting, so as to charge the battery 3.

Further, the charging box further includes a partition plate 12 arranged in the box body 1 to divide the box body 1 into a first cavity 101 and a second cavity 102. In the embodiment, a side of the partition plate 12 facing a curved surface at the bottom of the box body 1 is the first cavity 101 and the other side thereof is the second cavity 102. That is, the box body 1 is formed such that one side of the hemisphere is the first cavity 101 internally provided with the magnet pendulum bob 41, the coil structure 42, the generator 43, the transmission part 5 and the balancing weight 6, and the battery 3, the product cabin 11 and the circuit assembly 7 are arranged in the second cavity 102.

In the embodiment, the first end 411 of the magnet pendulum bob is rotatably connected with the partition plate 12. The connection is realized by a bolt, namely, a protrusion extends on the partition plate 12, so that the bolt passes therethrough, and the first end 411 of the magnet pendulum bob is further provided with a through hole where the bolt passes through. Optionally, the magnet pendulum bob may be rotatably connected with the partition plate 12 in other ways.

In the embodiment, the box cover 2 is rotatably arranged at the opening of the box body 1, so as to obtain an openable and closable effect. Optionally, an edge between the box cover 2 and the box body 1 may be provided with a magnet unit, so that the box cover 2 generates a magnet suction effect with the box body 1 when being closed, thereby improving the availability of the charging box. In the embodiment, the product cabin 11 is formed as a copying cabin of an earphone, so that an earphone product is partially exposed out of the box body 1 when the box cover 2 is opened. Optionally, the product cabin 11 may also be copying cabins of other products.

In the embodiment, the circuit assembly 7 may realize an effect of converting two alternating currents: the induced current generated by the coil structure 42 that cuts the magnetic field of the magnet pendulum bob 41 and the current generated by the generator 43 that converts kinetic energy of the magnet pendulum bob 41 into electric energy into direct currents and boosting the currents so as to charge the battery 3. Optionally, the circuit assembly 7 may further have other functions. For example, when electric energy in the battery 3 is saturated, the circuit assembly disconnects accesses between the circuit assembly and the coil structure 42 and between the circuit assembly and the generator 43, which is not limited herein.

A charging box provided by the embodiment of the present disclosure discloses includes a box body, a box cover, a battery, a charging assembly and a circuit assembly. The box body is internally provided with a product cabin for accommodating a product; the box cover is openably and closably arranged at an opening of the box body; the battery is arranged in the box body; the charging assembly comprises a magnet pendulum bob and a coil structure arranged in a periphery of the magnet pendulum bob, where a first end of the magnet pendulum bob is rotatably connected with the box body and a second end of the magnet pendulum bob is a free end; and the circuit assembly is electrically connected with the coil structure and the battery, where a bottom of the box body is formed as a curved surface. The charging box further includes a balancing weight arranged at the bottom of the box body. Therefore, according to a technical solution of the embodiment of the present disclosure, by arranging the charging box in a special shape, the charging box is in form of a tumbler, so that in swinging process of the charging box, the coil structure may cut a magnetic field of the magnet pendulum bob to generate induced current to charge the charging box so as to increase endurance.

The above is merely preferred embodiments of the present disclosure and is not used to limit the present disclosure. For those skilled in the art, various alternations and changes may be made on the present disclosure. Any modification, equivalent replacement, improvement, etc. made within the spirit and principle of the present disclosure may be regarded as within the protection scope of the present disclosure.

We claim:

1. A charging box, comprising:

a box body (1), internally provided with a product cabin (11), the product cabin (11) being configured to accommodate a product;

a box cover (2), openably and closably arranged at an opening of the box body (1);

a battery (3), arranged in the box body (1);

a charging assembly (4), comprising a magnet pendulum bob (41) and a coil structure (42) arranged in a periphery of the magnet pendulum bob (41), wherein a first end (411) of the magnet pendulum bob is rotatably connected with the box body (1) and a second end (412) of the magnet pendulum bob is a free end; and a circuit assembly (7), electrically connected with the coil structure (42) to receive an induced current generated by the coil structure (42), the circuit assembly (7) being electrically connected with the battery (3);

wherein the charging assembly (4) further comprises a generator (43), wherein the generator (43) is configured to convert kinetic energy generated by a motion of the magnet pendulum bob (41) into electric energy, and the generator (43) is electrically connected with the circuit assembly (7);

the charging box further comprises a transmission part (5), the transmission part (5) being configured to transmit a motion of the magnet pendulum bob (41) to the generator (43);

the circuit component (7) converts the induced current generated by the coil structure (42) cutting the magnetic field of the magnetic pendulum (41), as well as the current produced by the generator (43) converting kinetic energy of the magnetic pendulum (41) into electrical energy, into direct current to charge the battery (3).

2. The charging box according to claim 1, wherein a radial dimension of the first end (411) of the magnet pendulum bob is smaller than that of the second end (412).

3. The charging box according to claim 1, wherein the charging box further comprises a partition plate (12) arranged in the box body (1) to divide the box body (1) into a first cavity (101) and a second cavity (102).

4. The charging box according to claim 3, wherein the charging assembly (4), the generator (43) and the transmission part (5) are arranged in the first cavity (101); the battery (3), the product cabin (11) and the circuit assembly (7) are arranged in the second cavity (102).

5. The charging box according to claim 3, wherein the first end (411) of the magnet pendulum bob is rotatably connected with the partition plate (12).

6. The charging box according to claim 1, wherein the coil structure (42) comprises a coil bracket (421), the generator (43) being fixedly arranged on an outer side of the coil bracket (421).

7. The charging box according to claim 1, wherein the transmission part (5) comprises a first gear set (51), a transmission bar (52) and a second gear set (53), the magnet pendulum bob (41) being connected with the first gear set, the generator (43) being connected with the second gear set (53), the first gear set (51) and the second gear set (53) being connected through the transmission bar (52).

8. The charging box according to claim 1, wherein the product is an earphone, the product cabin (11) being configured to be a copying slot for fixing the earphone, wherein a bottom of the box body (1) is formed as a curved surface, and the charging box further comprises a balancing weight (6) arranged in the box body (1).

9. The charging box according to claim 2, wherein the product is an earphone, the product cabin (11) being configured to be a copying slot for fixing the earphone, wherein a bottom of the box body (1) is formed as a curved surface, and the charging box further comprises a balancing weight (6) arranged in the box body (1).

10. The charging box according to claim 3, wherein the product is an earphone, the product cabin (11) being configured to be a copying slot for fixing the earphone, wherein a bottom of the box body (1) is formed as a curved surface, and the charging box further comprises a balancing weight (6) arranged in the box body (1).

11. The charging box according to claim 4, wherein the product is an earphone, the product cabin (11) being configured to be a copying slot for fixing the earphone, wherein a bottom of the box body (1) is formed as a curved surface, and the charging box further comprises a balancing weight (6) arranged in the box body (1).

12. The charging box according to claim 5, wherein the product is an earphone, the product cabin (11) being configured to be a copying slot for fixing the earphone, wherein a bottom of the box body (1) is formed as a curved surface, and the charging box further comprises a balancing weight (6) arranged in the box body (1).

13. The charging box according to claim 6, wherein the product is an earphone, the product cabin (11) being configured to be a copying slot for fixing the earphone, wherein a bottom of the box body (1) is formed as a curved surface, and the charging box further comprises a balancing weight (6) arranged in the box body (1).

14. The charging box according to claim 7, wherein the product is an earphone, the product cabin (11) being configured to be a copying slot for fixing the earphone, wherein a bottom of the box body (1) is formed as a curved surface, and the charging box further comprises a balancing weight (6) arranged in the box body (1).

* * * * *